United States Patent
De Hoog et al.

(10) Patent No.: US 9,929,665 B2
(45) Date of Patent: Mar. 27, 2018

(54) REMOTELY CONTROLLABLE MODULAR POWER CONTROL DEVICE FOR POWER GENERATION

(71) Applicant: INTERNATIONAL BUSINESS MACHINES CORPORATION, Armonk, NY (US)

(72) Inventors: Julian De Hoog, Eaglemont (AU); Shivkumar Kalyanaraman, Bangalore (IN); Ramachandra Kolluri, Balaclava (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/134,027

(22) Filed: Apr. 20, 2016

(65) Prior Publication Data

US 2017/0310232 A1 Oct. 26, 2017

(51) Int. Cl.
  *H02M 7/537* (2006.01)
  *H02M 5/42* (2006.01)
  *H02M 1/08* (2006.01)
  *H02M 1/00* (2006.01)

(52) U.S. Cl.
  CPC ............... *H02M 5/42* (2013.01); *H02M 1/08* (2013.01); *H02M 2001/0009* (2013.01)

(58) Field of Classification Search
  CPC ...... H02J 3/18; H02J 3/50; H02J 3/16; H02M 7/48; G05F 1/70; Y02B 70/12
  USPC ..... 363/16–20, 34–41, 89, 97, 98, 132, 127; 307/18, 22, 26, 31, 151; 323/205, 224, 323/235, 207, 906; 700/295, 297, 298
  See application file for complete search history.

(56) References Cited

U.S. PATENT DOCUMENTS

| 6,411,067 | B1 | 6/2002 | Bjorklund | |
| 7,560,906 | B2 * | 7/2009 | Liu | H02J 4/00 322/44 |
| 7,667,351 | B2 * | 2/2010 | Marwali | H02J 9/062 307/87 |
| 8,085,564 | B2 * | 12/2011 | Klodowski | H02M 7/48 363/97 |

(Continued)

FOREIGN PATENT DOCUMENTS

| CN | 203377599 | 1/2014 |
| CN | 203707794 | 7/2014 |

(Continued)

OTHER PUBLICATIONS

Chia-Tse Lee et al., "A Low-Voltage Ride-Through Technique for Grid-Connected Converters of Distributed Energy Resources", IEEE Transactions on Industry Applications, vol. 47, No. 4, Jul./Aug. 2011, pp. 1821-1832.

(Continued)

*Primary Examiner* — Rajnikant Patel
(74) *Attorney, Agent, or Firm* — F. Chau & Associates, LLC

(57) ABSTRACT

A power adjusting circuit includes a sensor configured to measure a voltage and a current of the first AC output by an inverter, an AC/DC/AC converter configured to receive the first AC output from the inverter, and a controller configured to convert the first AC output to a second AC output having a desired power factor.

22 Claims, 10 Drawing Sheets

(56) References Cited

U.S. PATENT DOCUMENTS

| | | | | |
|---|---|---|---|---|
| 8,249,758 | B2* | 8/2012 | Schugart | H02J 3/16 290/44 |
| 8,259,479 | B2* | 9/2012 | Wagoner | H02J 3/38 363/131 |
| 8,611,107 | B2* | 12/2013 | Chapman | H02M 3/33523 323/906 |
| 8,688,287 | B2* | 4/2014 | Khajehoddin | H02J 3/383 700/298 |
| 8,693,228 | B2* | 4/2014 | Matan | H02J 3/18 323/207 |
| 9,083,173 | B2 | 7/2015 | Nethery, III | |
| 9,325,173 | B2* | 4/2016 | Varma | H02J 3/01 |
| 2008/0285317 | A1* | 11/2008 | Rotzoll | H02M 7/003 363/80 |
| 2010/0067271 | A1 | 3/2010 | Garces et al. | |
| 2010/0195357 | A1 | 8/2010 | Fornage et al. | |
| 2010/0264739 | A1 | 10/2010 | Errington | |
| 2011/0007537 | A1 | 1/2011 | Fornage | |
| 2011/0285362 | A1 | 11/2011 | Huomo | |
| 2011/0305049 | A1* | 12/2011 | Raptis | H02J 9/062 363/34 |
| 2012/0290145 | A1 | 11/2012 | Joshi et al. | |
| 2013/0015710 | A1 | 1/2013 | Rotzoll et al. | |
| 2013/0049471 | A1 | 2/2013 | Oleynik et al. | |
| 2013/0320770 | A1 | 12/2013 | Panosyan et al. | |

FOREIGN PATENT DOCUMENTS

| | | |
|---|---|---|
| CN | 203942283 | 11/2014 |
| CN | 203965921 | 11/2014 |
| CN | 204190402 | 3/2015 |
| CN | 104578137 | 4/2015 |

OTHER PUBLICATIONS

J. Rekola, "DC Distribution and Power Electronics Applications in Smart Grids." [Published Online in 2012]. Available: https://webhotel2.tut.fi/units/set/opetus/kurssit/SET_1520/Materiaalit-2012/Jenni_DC-distribution.pdf.

Nitin P. Choudhary et al., "Controlling of Back to Back Converter for Load Sharing in Microgrid and Utility Grid", 2013 Third International Conference on Advances in Computing and Communications, 2013 IEEE, pp. 287-291.

Biao Zhao, et al., "Next-Generation Multi-Functional Modular Intelligent UPS System for Smart Grid", IEEE Transactions on Industrial Electronics, vol. 60, No. 9, Sep. 2013, pp. 3602-3618.

Enrique Romero-Cadaval, et al., "Grid-Connected Photovoltaic Plants", IEEE Industrial Magazine, Mar. 2015, pp. 18-32.

Sweeka Meshram, et al., "Performance Analysis of Grid Iintegrated Hydro and Solar Based Hyrbid Systems", Hindawai Publishing Corporation, Advances in Power Electronics, 2013, pp. 1-7.

\* cited by examiner

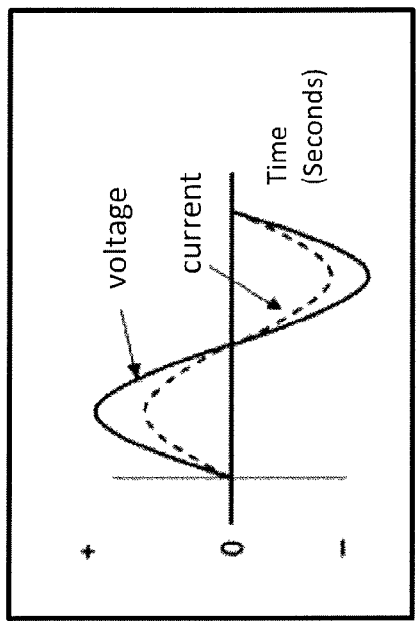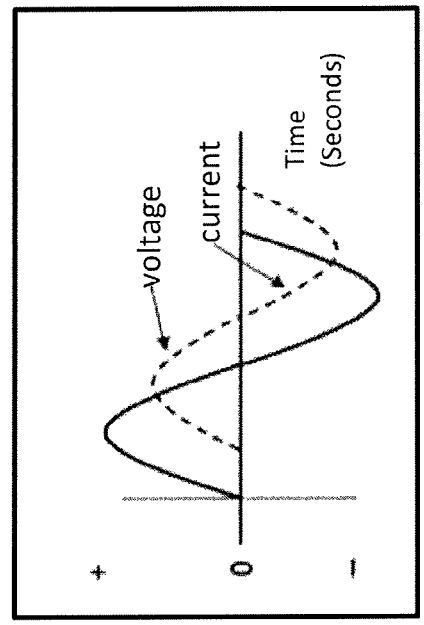

REMOTELY CONTROLLABLE MODULAR POWER CONTROL DEVICE FOR POWER GENERATION

BACKGROUND

The present invention relates to the field of power generation, and more particularly to the use of distributed power generation systems to supply both real and reactive power to an electrical grid.

An electrical grid is an interconnected network for delivering electricity from suppliers to consumers. It usually consists of generating stations that produce electrical power, high-voltage transmission lines that carry power from distant sources to demand centers, and distribution lines that connect individual customers. The power provided by the grid typically includes a combination of active power (real power), measured in watts, and reactive power measured in volt-amperes reactive ("var").

An electrical grid may contain many distributed generation sources. For example, a resident can supplement the power from the grid ("grid power") that is provided to their residence with power generated by a residential power generation system ("local power") installed within the residence. For example, the residential power generation system could provide 10% of the power required to the residence while the grid provides the remaining 90%. When the power generated by the residential power generation system is greater than the needs of the residence, the residential power generation system can supply power to the grid so it can be used by other residences.

A photovoltaic (PV) system is an example of a residential power generation system. A PV system converts sunlight directly to electricity. A PV system works any time the sun is shining, but more electricity is produced when the sunlight is more intense. A typical PV system provides only active power and is incapable of providing reactive power.

SUMMARY

According to an exemplary embodiment of the inventive concept, a power adjusting circuit includes a sensor configured to measure a voltage and a current of the first AC output by an inverter, an AC/DC/AC converter configured to receive the first AC output from the inverter, and a controller configured to convert the first AC output to a second AC output having a desired power factor.

According to an exemplary embodiment of the inventive concept, a power adjusting circuit includes a sensor configured to measure a voltage and a current of a first AC output by an inverter, a first AC/DC/AC converter configured to receive the first AC output from the inverter and a first controller configured to control the first AC/DC/AC converter, and a second AC/DC/AC converter configured to receive the first AC output from the inverter and a second controller configured to control the second AC/DC/AC converter. The controllers negotiate with one another to determine first and second amounts of power to provide. The first controller applies a first adjustment signal to the first AC/DC/AC converter based on the first amount and the second controller applies a second adjustment signal to the second AC/DC/AC converter based on the second amount, to cause the AC/DC/AC converters to collectively generate a second AC output which is different from the first AC output.

According to an exemplary embodiment of the inventive concept, a power adjusting circuit includes a sensor configured to measure a voltage and a current of a first AC output by an inverter, a first AC/DC/AC converter configured to receive the first AC output from the inverter and a first controller configured to control the first AC/DC/AC converter, a second AC/DC/AC converter configured to receive the first AC output from the inverter and a second controller configured to control the second AC/DC/AC converter, and a central controller configured to inform the first controller of a first amount of power to provide and inform the second controller of a second amount of power to provide. The first controller applies a first adjustment signal to the first AC/DC/AC converter based on the first amount and the second controller applies a second adjustment signal to the second AC/DC converter based on the second amount, to cause the AC/DC/AC converters to collectively generate a second AC output which is different from the first AC output.

BRIEF DESCRIPTION OF THE SEVERAL VIEWS OF THE DRAWINGS

Through the more detailed description of some embodiments of the present disclosure in the accompanying drawings, features of the present disclosure will become more apparent, wherein:

FIG. 9A and FIG. 9B show examples of in-phase voltage and currents and out-of phase voltage and currents, respectively.

DETAILED DESCRIPTION

Figure 1:
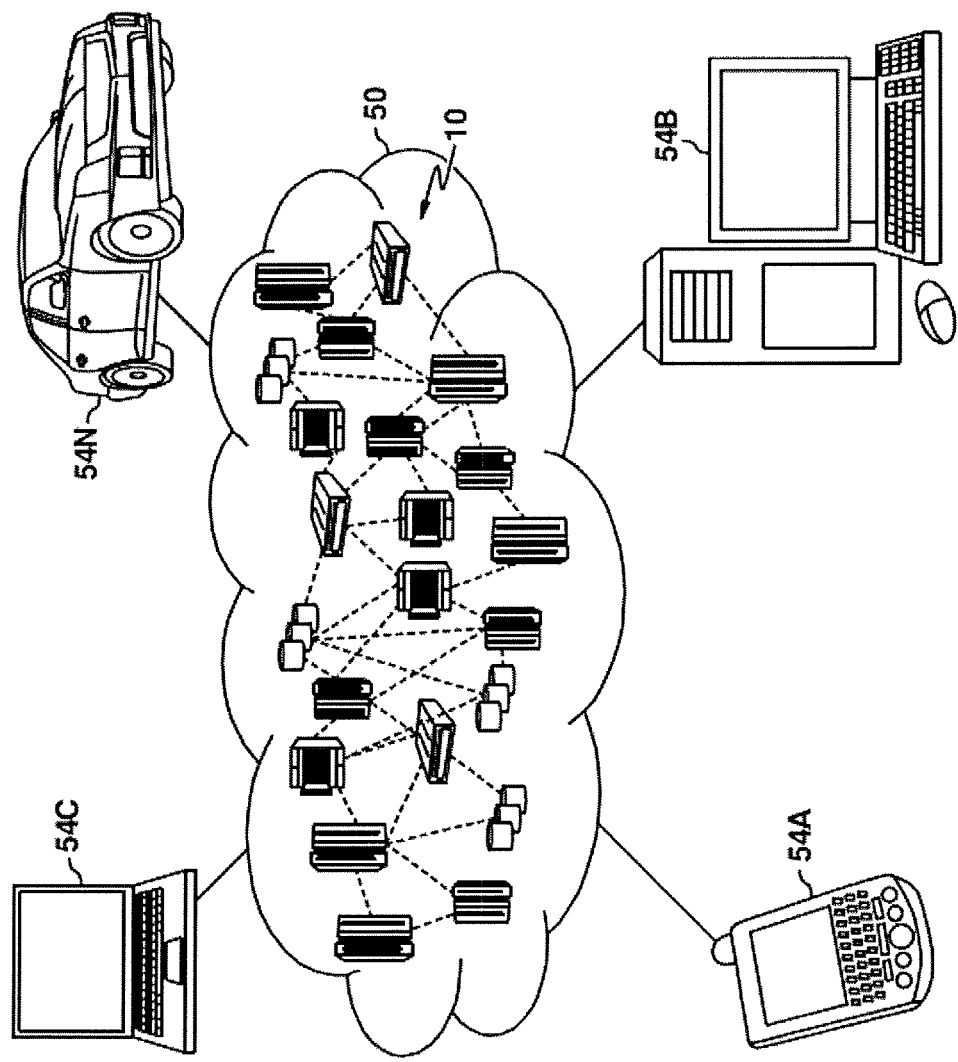
FIG. 1 illustrates a cloud computing environment according to an embodiment of the present invention.

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes. Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
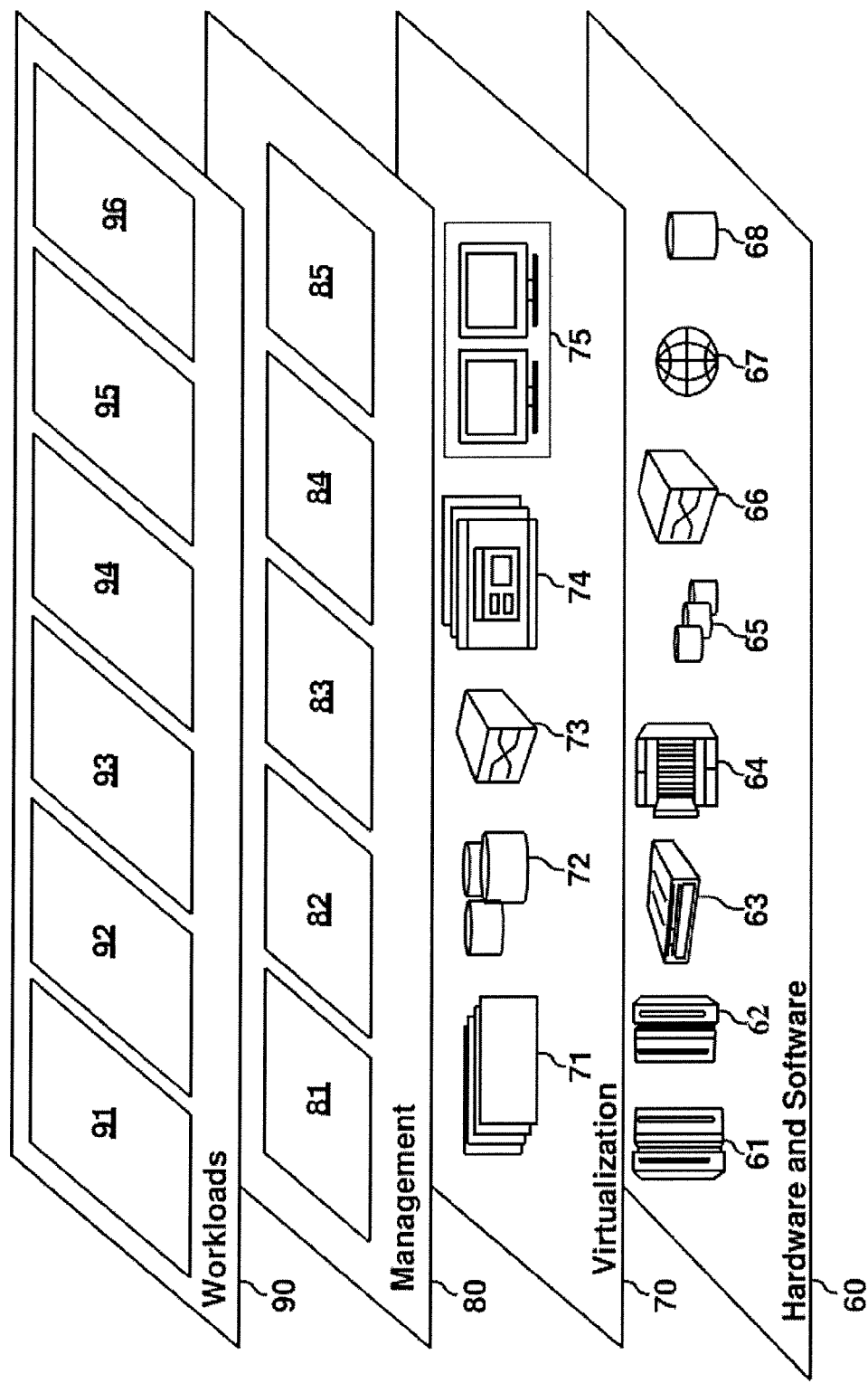
FIG. 2 depicts abstraction model layers according to an embodiment of the present invention, which may be used to implement a power management controller.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a power management controller 96. The power management controller 96 is used to control a local power adjusting circuit that interfaces with a residential power generation system, and will be discussed in more detail below.

Figure 3:
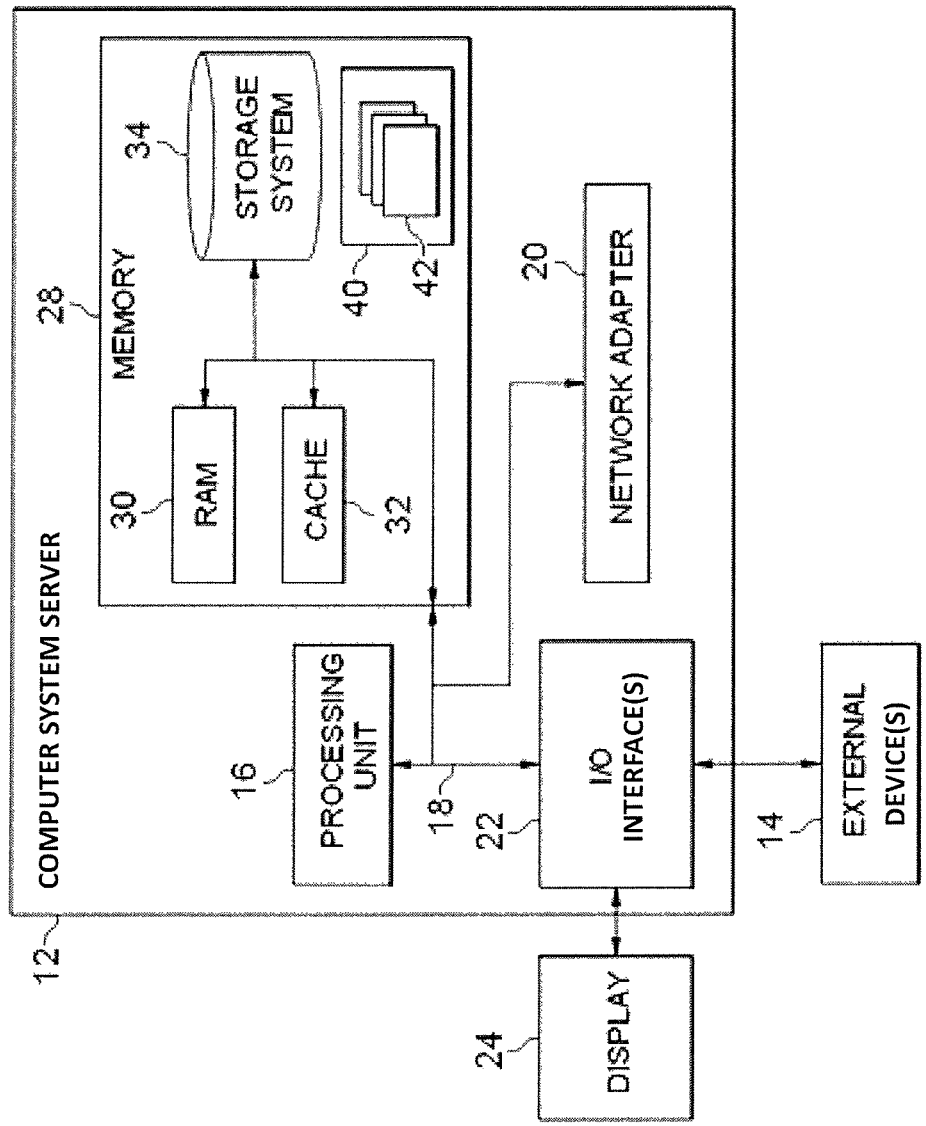
FIG. 3 shows an exemplary computer system, in which the power management controller may reside.

FIG. 3 illustrates an embodiment of a computer server that may be used to implement part of computing devices 54A-54N, the power management controller 96, or the global controller 490, which is applicable to implementing embodiments of the present invention. Computer system/server 12 is only illustrative and is not intended to suggest any limitation as to the scope of use or functionality of embodiments of the invention described herein.

As shown in FIG. 3, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32.

The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 4:
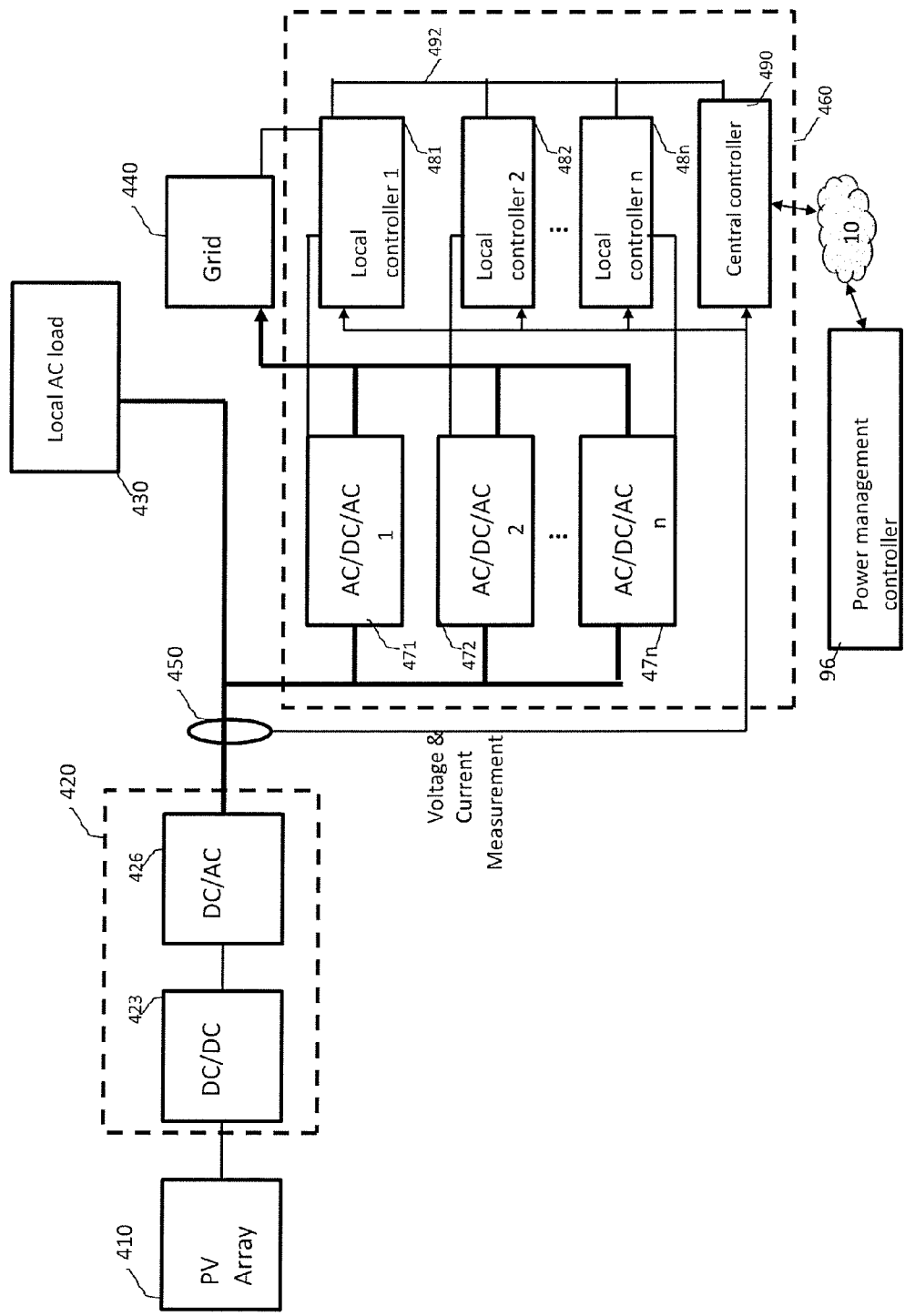
FIG. 4 shows a system according to an exemplary embodiment of the invention that includes the power management controller.

FIG. 4 shows a system according to an exemplary embodiment of the invention. The system includes the power management controller 96 of FIG. 2, a photovoltaic (PV) array 410, a PV inverter system 420, a current and voltage sensor 450, and a local power adjusting circuit 460. The PV inverter 420 includes a DC/DC converter 423 and a DC/AC converter 426. The DC/DC converter 423 is designed to convert a first DC signal input to the DC/DC converter 423 to a different second DC signal. The DC/AC converter 426 is designed to convert the second DC signal to an AC signal that is compatible with the main power Grid 440. For example, in North America, the AC signal is typically 120 v with a frequency of 60 Hz, and in Europe, the AC signal is typically 230 v with a frequency of 50 Hz. FIG. 4 also depicts a local AC load 430 that corresponds to the load of a device (e.g., a light, appliance, etc.) consuming power of the AC signal.

When the PV inverter system 420 provides a first AC output including only active power (e.g., no reactive power), the local adjusting circuit 460 is capable of performing an operation on the first AC output to generate a second AC output including both active power and reactive power or only reactive power, and provide the second AC output to the Grid 440.

The local adjusting circuit 460 may receive a request signal from an external source such as the power management controller 96 across a computer network, the Internet, or across one or more of the cloud computing nodes 10. The power management controller 96 may communicate the request message to the local adjusting circuit 460 using the network adaptor 20. The power management controller 96 or the network adaptor 20 may include a transceiver to wirelessly transmit the request signal to the central controller 490. The central controller 490 may include the network adaptor 20 to receive the request signal or a transceiver to wirelessly receive the request signal.

In an embodiment, the request signal includes a requested amount of reactive power (e.g., a certain amount of reactive current) and a requested amount of active power (e.g., a certain amount of active current). For example, the request signal could include a request for partial reactive power and partial active power. In an embodiment, the request signal includes requests for particular harmonics (e.g., a distortion of the current that introduces harmonics). For example, the request signal could include a request for additional power in the $5^{th}$ harmonic. In an embodiment, the request signal includes a requested amount of reactive power, a requested amount of active power, and a requested amount of harmonics.

The local adjusting circuit 460 includes the central controller 490, a plurality of AC/DC/AC converters 471, 472, . . . , 47n, and a plurality of local controllers 481, 482, . . . , 48n. In an embodiment, each local controller is a digital signal processing system, which is optically isolated and can drive switches of the AC/DC/DC converters using a pulse width modulation signal. While the local adjusting circuit 460 is depicted as including several AC/DC/AC converters and several local controllers, in an alternate embodiment, only a single AC/DC/AC converter and a single local controller are present. Further, in this embodiment, the single local controller performs the functions of the central controller 490 and the central controller 490 is omitted. The multiple AC/DC/AC converters and local controllers allow the local adjusting circuit 460 to operate in a modular fashion. Each AC/DC/AC converter and local controller pair can be controlled by the central controller 490 to handle the reactive/active power requirements as well as a portion of the harmonic requirements. For example, the first local controller 481 could be controlled to handle part of the reactive power requirements and the second controller 482 could be controlled to handle part of the reactive power requirements. For example, the first local controller 481 could be controlled to introduce $5^{th}$ harmonics while the second controller 482 could be controlled to introduce $7^{th}$ harmonics.

In an embodiment, the voltage and current sensor 450 is a non-contact current and voltage sensor such as a Hall effect sensor. The sensor may include a housing that contains the current and voltage sensors, which may be a ferrite cylinder, loop, or ring with a Hall effect sensor disposed in a gap along the circumference to measure current, or in the alternative, a winding provided through the cylinder along its axis and a capacitive plate or wire disposed adjacent to, or within, the ferrite cylinder to provide an indication of the voltage. For example, the cylinder, loop, or ring may encircle the wire connected to an output terminal of the PV inverter 420.

The central controller 490 can operate on a measured current and voltage received from the voltage and current sensor 450 to determine the amount of active power and reactive power presently being generated. For example, it is initially assumed that the measured current and measured voltage are in phase with one another like in FIG. 9A, and thus only active power is being provided. For example, if the measured current is 5 amps and the measured voltage is 110 volts, 550 watts of active power is available with 0 var of reactive power. Assuming the power management controller 96 has requested 550 vars of reactive power, it would be feasible that the requested amount of power (i.e., 0% active power and 100% reactive power) can be provided. However, since no reactive power is presently available, the central controller 490 needs to provide signals to one or more of the local controllers 481, 482, . . . , 48n along local bus 492 to inform the respective local controllers of the amount of reactive power each is to support. The central controller 490 can make this decision based on the individual efficiencies and power capacities of the respective AC/DC/AC converters.

In a first example, only the first local controller 481 is used. In this example, the central controller 490 provides a signal to the first local controller 481 indicating that it is to provide only reactive power. Since no reactive power is currently being provided, the first local controller 481 applies a signal to the first AC/DC/AC converter 471 that causes the first AC/DC/AC converter to operate on the first AC output from the PV inverter system 420 to generate a second AC output that provides entirely reactive power. For example, if the current and voltage of the first AC signal are entirely in phase with one another, the first local controller 481 applies an adjustment signal to the first AC/DC/AC converter 471 that causes the first AC/DC/AC converter 471 to generate the second AC output such that the phase of current of the second AC output is out of phase by 90 degrees with the voltage of the second AC output.

Figure 5:
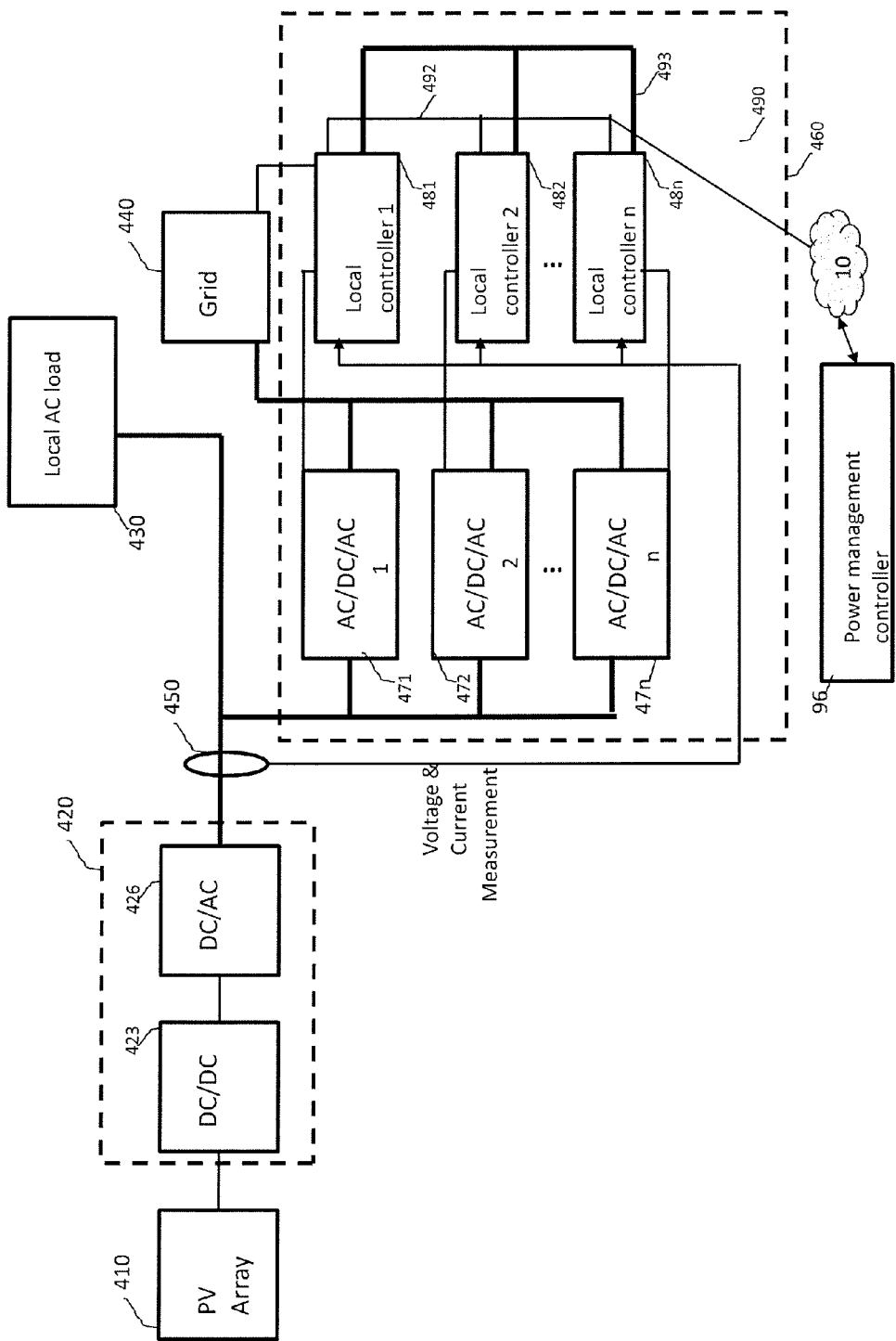
FIG. 5 shows a system according to an exemplary embodiment of the invention that includes the power management controller.

In an embodiment, each local controller includes a phase locked loop (PLL) that measures a voltage, frequency, and phase of the grid 440. For example, FIG. 4 and FIG. 5 show a connection from the first local controller 481 to the grid 440. Once the PLL locks onto the information of the grid 440, real/active power and reactive power can be provided. Supplying current in-phase with a voltage of the grid 440 corresponds to real power at a power factor of 1 and supplying power out-of-phase with the voltage of the grid 440 corresponds to real and reactive power with a power factor not equal to 1. The figures only show the grid 440 being connected to one of the local controllers for ease of illustration. However, the other local controllers may be additionally connected to the grid 440 to enable their respective PLL to perform the above measuring and locking.

For example, if the central controller 490 provides power requirements to the first local controller 481, the first controller 481 computes a target current with an associated target voltage, and the first local controller 481 changes the voltage output of the first AC/DC/AC converter 471 to meet the target voltage in such a way that an output current of the first AC/DC/AC converter 471 reaches the target current. For example, the first local controller 481 may apply a PWM signal (e.g., an adjustment signal) to internal switches of the first AC/DC/AC converter 471 to meet the target voltage.

In an exemplary embodiment, the first local controller 481 periodically applies the adjustment signal to the first AC/DC/AC converter 471 to make small adjustments in the phase difference among the measured current and voltage until it reaches the desired phase difference. For example, if a 90 degree phase difference is desired, the first local controller 481 could apply an adjusting signal to the first AC/DC/AC converter 471 periodically (e.g., every millisecond) that increases/decreases the phase difference by a small amount (e.g., 2 degrees) until the desired phase difference (e.g., 90 degrees) is achieved.

In another example, it is assumed that two of local controllers 481 and 482 and their corresponding AC/DC/AC converters 471 and 472 are used, and the central controller 490 has informed the first local controller 481 it is to provide a power factor of 0 (all reactive power) and informed the second local controller 481 it is to provide a power factor of 0.707 (some reactive and some real power). For example, if the second AC/DC/AC converter 472 is outputting 5 amps and 110 volts, when set to a power factor of 0.707, it would output about 389 watts of Active power (e.g., cosine of 45 degree phase angle (i.e., a power factor of 0.707)*5 amps*110 volts), and 389 vars of Reactive power (e.g., sine of 45 degrees*5 amp*110 volts). For example, the first local controller 481 may apply a first adjustment signal to the first AC/DC/AC converter 471 to set the first AC/DC/AC converter 471 to a power factor of 0 and the second local controller 482 may apply a second adjustment signal to the second AC/DC/AC converter 472 to set the second AC/DC/AC converter to the power factor of 0.707.

While the above examples reference phase differences of 0 degrees and 45 degrees, and power factors of 0 and 0.707, the invention is not limited thereto. For example, various phase differences and power factors may be used to achieve various amounts of reactive and active power.

In addition, different local controllers may supply different harmonics. In an embodiment, each local controller may be uniquely designed to additionally introduce one requested harmonic at the required level of power. In another embodiment, each local controller may supply a partially or fully distorted current such that the sum of all local controllers' outputs results in a waveform having the harmonics as requested.

FIG. 5 illustrates a variation on the embodiment depicted in FIG. 4. In FIG. 5, the central controller 490 is omitted. The local controllers 481 receive the voltage and current measurements from the sensor 450 and receive the requests from the power management controller 96 for various combinations of active, reactive, and/or harmonic power. The local controllers 481-48n can determine how much power is presently being provided by the PV system 120 from the sensed voltage and current, the types of power (e.g., reactive, active, harmonic) and the amounts of these types or the current power factor. The local controllers 481-48n communicate with one another through bus 493 to decide amongst themselves how much of the various types of power they will be responsible for providing. For example, if the first local controller 481 determines from the capacity and efficiency of the first AC/DC/AC converter 471, that it can provide 80% of the reactive and active power requirements and the second controller 482 determines from the capacity and efficiency of the second AC/DC/AC converter 472, that it can provide 40% of the reactive and active power requirements, they could negotiate with one another such that the first controller 481 ultimately is responsible for 70% while the second controller is ultimately responsible for 30%.

Figure 6:
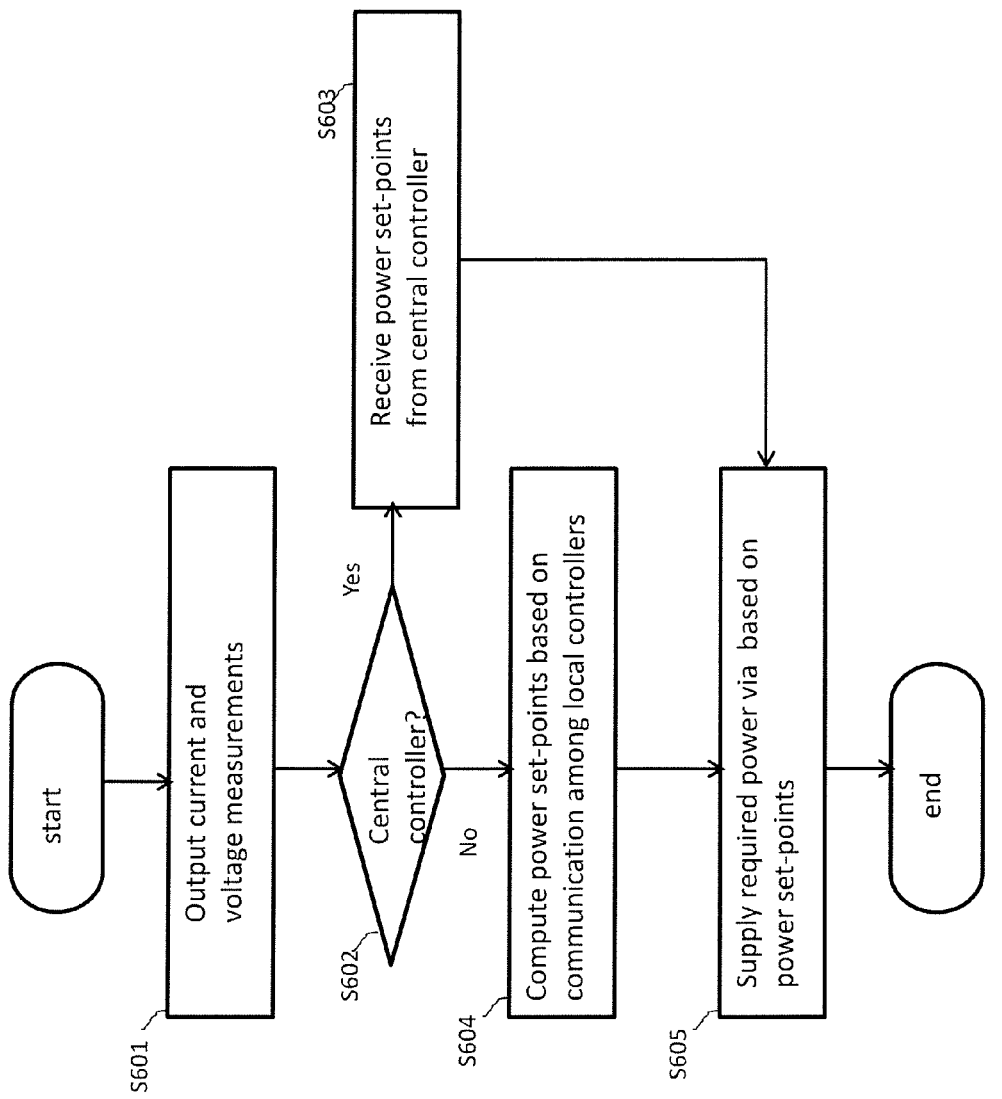
FIG. 6 illustrates a method of supplying power according to an exemplary embodiment of the inventive concept.

FIG. 6 illustrates a method of supplying power that can be applied to either the system of FIG. 4 or the system of FIG. 5. The method includes outputting the current and voltage measurements (S601). For example, if the system of FIG. 4 is used, then the current and voltage measurements are output to the central controller. For example, if the system of FIG. 5 is used, then the current and voltage measurements are output to the local controllers 481-48n. The method then includes determining whether a central controller is present (S602). This determination can be performed by the local controllers 481-4n. For example, if the local controllers 481-48n ping the central controller 490, and receive no response, it can be concluded that no central controller is available. If the central controller is present, then the system of FIG. 4 is the system being used. The local controllers 481-48n then receive the power set-points from the central controller (S603). For example, upon determining that the central controller 490 is available, the local controllers 481-48n can send messages to the central controller 490 requesting information on the amounts of power and types of power needed. The power set-points may correspond to the amounts of power and the types of power needed. If the central controller 490 is not available (e.g., system of FIG. 5), the local controllers 481-48n compute the power set-points (e.g., power factors) themselves based on communications between themselves (S604). Once the power set-points have been computed or received, the local controllers supply the required power based on the power set points (S605).

Figure 7:
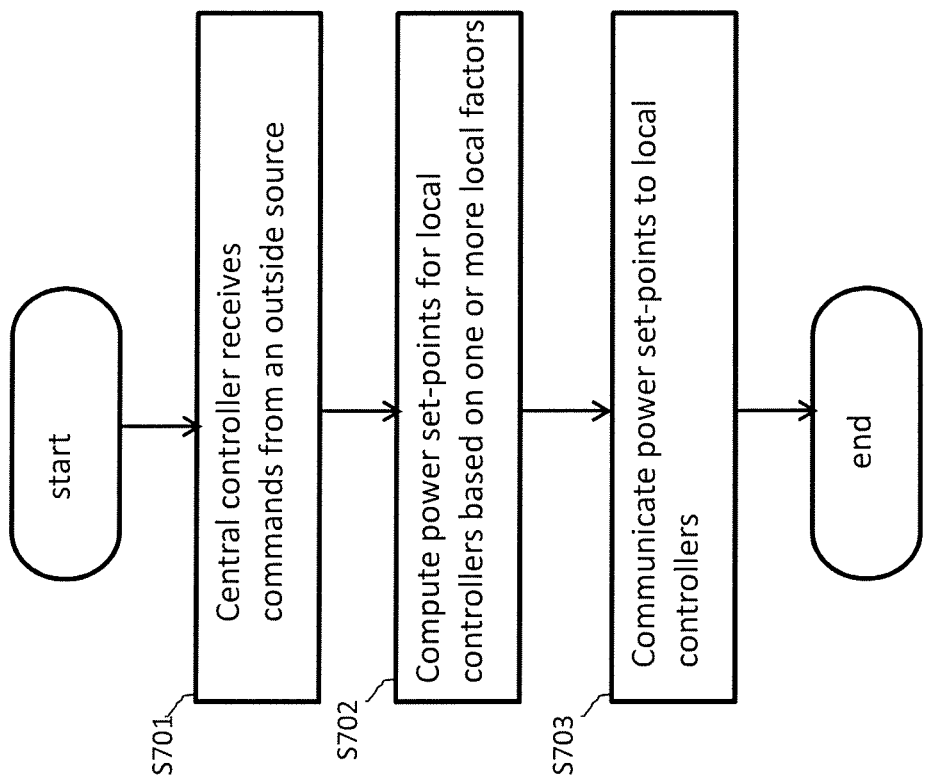
FIG. 7 illustrates a method of communicating power-set points according to an exemplary embodiment of the inventive concept.
Figure 8:
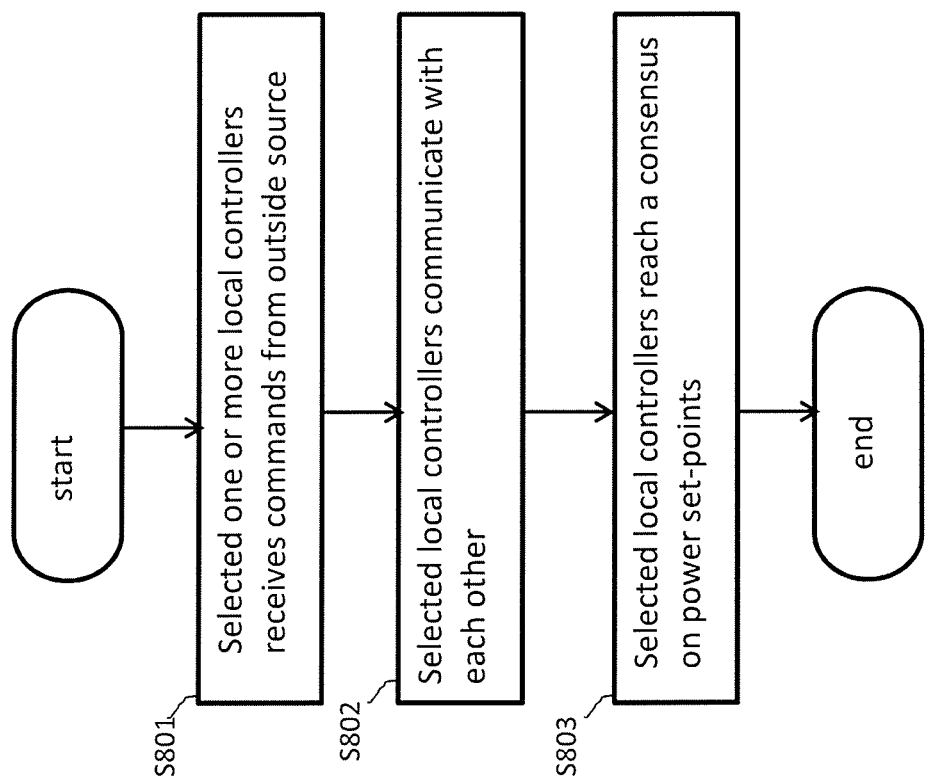
FIG. 8 illustrates a method of communicating power-set points according to an exemplary embodiment of the inventive concept.

FIG. 7 is a method that can be applied to the system of FIG. 4. The central controller 490 receives commands from an outside source (S701). For example, the central controller 490 may receive a command from the power management controller 96 that indicates a certain amount of power to provide and the breakdown of the different types (e.g., reactive, active, harmonic) and the amounts of each to provide. The method includes computing the power set-points for the local controllers based on one or more local factors (S702). For example, the computation cam be performed by the central controller 490 taking into consideration power efficiencies and power capacities of the AC/DC/AC converters 471-47n. For example, each set-point may correspond to one of a selected group of the local controllers, where each set point indicates amounts and types of power to provide. The method includes communicating the computed power set-points to the local controllers (S703). For example, the central controller 490 may send the power set-points to the respective local controllers using bus 492 in FIG. 4.

FIG. 7 is a method that can be applied to the system of FIG. 5. The method includes a selected one or more of the local controllers receiving commands from an outside source (S801). For example, the outside source may be the power management controller 96 and the commands may request a certain amount of active, real, and/or harmonic power (i.e., the power requirements). The method includes the selected controllers communicating with one another (S802) and reaching a consensus on the power set-points (S803). For example, the local controllers of FIG. 5 can negotiate with one another based on the current amounts and types of power being provided by the PV system 420, the power requirements, to reach a consensus that indicates how much power of the power requirements they are responsible for providing.

Figure 10:
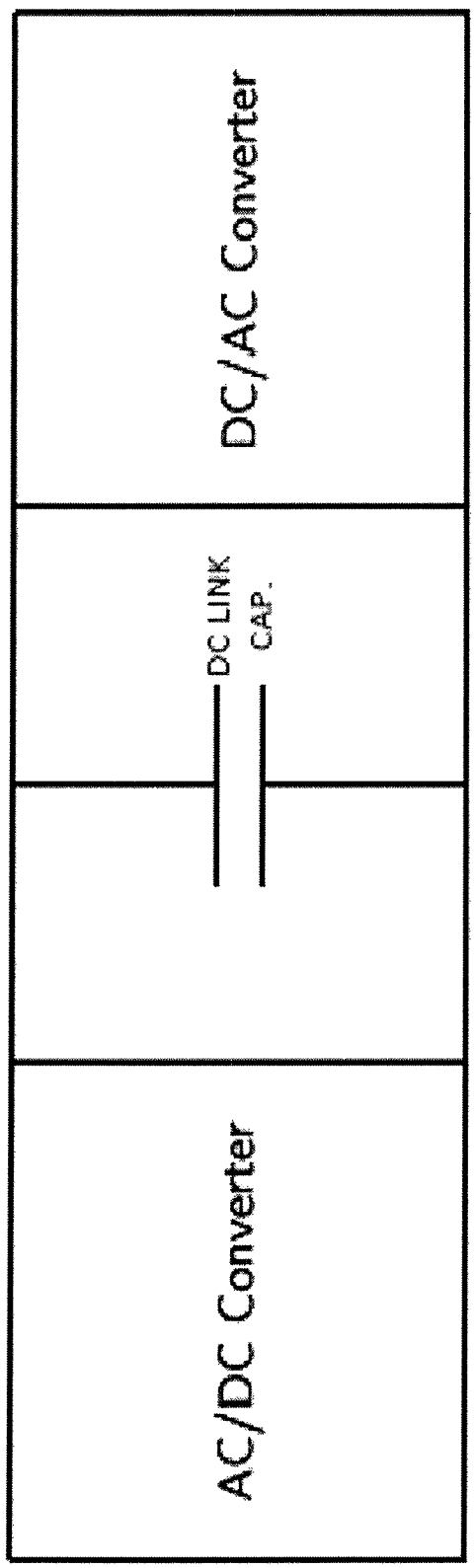
FIG. 10 illustrates an embodiment of an AC/DC/AC converter of the systems of FIG. 4 and FIG. 5.

FIG. 10 illustrates an embodiment of an AC/DC/AC converter of FIG. 4 or FIG. 5. For example, the AC/DC/AC converter 471 may include an AC/DC converter, a DC link capacitor, a DC/AC converter connected in parallel with one another. The AC/DC converter receives a first AC signal output from the PV inverter 420 and provides a DC output to the DC link capacitor to charge the DC link capacitor. The DC link capacitor provided input to the DC/AC converter, which converts the DC output to a second AC signal. Even when the first AC signal only includes active power, the second AC signal may include both active power and reactive power, as well as additional harmonics.

The present invention may be a system, and parts of the prevent invention may be implemented by a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A power adjusting circuit comprising:
a sensor positioned at an output of an inverter to measure a voltage and a current of a first AC signal output by the inverter;
an AC/DC/AC converter connected to the output of the inverter to receive the first AC signal output from the inverter; and
a controller wirelessly receives a request signal including a first amount of desired active power and a second amount of desired reactive power, determines a third amount of active power and a fourth amount of reactive power in the first AC signal from the measured voltage and current, determines an adjustment signal based on the first through fourth amounts, and applies the adjustment signal to the AC/DC/AC converter to cause the AC/DC/AC converter to convert the first AC signal to a second AC signal having the first amount of the desired active power and the second amount of the desired reactive power,
wherein the inverter comprises a DC/DC converter receiving an output of a photovoltaic array and a DC/AC converter receiving an output of the DC/DC converter.

2. The power adjusting circuit of claim 1, wherein the first AC signal is at a unity power factor and the second AC signal is at a desired power factor not equal to the unity power factor.

3. The power adjusting circuit of claim 1, wherein the controller determines a fifth amount of harmonic power in the first AC signal, the request signal includes a sixth amount of desired harmonic power, the controller determines the adjustment signal by further using the fifth and sixth amounts, and the adjustment signal further causes the second AC signal to include the sixth amount of the desired harmonic power.

4. The power adjusting circuit of claim 2, wherein the controller applies the adjustment signal to the AC/DC/AC converter periodically to gradually convert the first AC signal having the unity power factor to the second AC signal having the desired power factor.

5. The power adjusting circuit of claim 1, wherein the AC/DC/AC converter comprises an AC/DC converter, a DC link capacitor, and a DC/AC converter connected in parallel with one another, wherein the AC/DC converter receives the first AC signal output by the inverter.

6. The power adjusting circuit of claim 1, wherein the sensor is a Hall effect sensor including a portion encircling a wire connected to an output of the inverter.

7. A power adjusting circuit comprising:
a sensor positioned at an output of an inverter to measure a voltage and a current of a first AC signal output by the inverter;
a first AC/DC/AC converter connected to the output of the inverter to receive the first AC signal output from the inverter and a first controller that controls the first AC/DC/AC converter; and
a second AC/DC/AC converter connected to the output of the inverter to receive the first AC signal output from the inverter and a second controller that controls the second AC/DC/AC converter,
wherein the controllers negotiate with one another to determine first and second amounts of active power to provide, and third and fourth amounts of reactive power to provide,
wherein the first controller applies a first adjustment signal to the first AC/DC/AC converter based on the first amount and the third amount and the second controller applies a second adjustment signal to the second AC/DC/AC converter based on the second amount and fourth amount, to cause the AC/DC/AC converters to collectively generate a second AC signal having a different power factor from the first AC signal, the second AC signal having an amount of active power totaling the first and second amounts and an amount of reactive power totaling the third and fourth amounts.

8. The power adjusting circuit of claim 7, wherein the first AC signal has current in phase with a grid voltage and the second AC signal has current that is in or out of phase with the grid voltage.

9. The power adjusting circuit of claim 7, wherein the first AC signal consists entirely of active power and the second AC signal contains reactive and harmonic power.

10. The power adjusting circuit of claim 7, wherein the controllers wirelessly receive a total of the first and second amounts of active power and a total of the third and fourth amounts of reactive power to generate.

11. The power adjusting circuit of claim 7, wherein each AC/DC/AC converter comprises an AC/DC converter, a DC link capacitor, and a DC/AC converter connected in parallel with one another, wherein the AC/DC converter receives the first AC signal output by the inverter.

12. The power adjusting circuit of claim 7, wherein the inverter comprises a DC/DC converter receiving an output of a photovoltaic array and a DC/AC converter receiving an output of the DC/DC converter.

13. The power adjusting circuit of claim 7, wherein the sensor is a Hall effect sensor including a portion encircling a wire connected to an output of the inverter.

14. The power adjusting circuit of claim 7, wherein the controllers apply their respective adjustment signals to their respective AC/DC/AC converters periodically to gradually produce the second AC signal having the power factor.

15. A power adjusting circuit comprising:
a sensor positioned at an output of an inverter to measure a voltage and a current of a first AC signal output by the inverter;
a first AC/DC/AC converter connected to an output of the inverter to receive the first AC signal output from the inverter and a first controller that controls the first AC/DC/AC converter;
a second AC/DC/AC converter connected to an output of the inverter to receive the first AC signal output from the inverter and a second controller that controls the second AC/DC/AC converter; and
a central controller informs the first controller of a first amount of power to provide and informs the second controller of a second amount of power to provide,
wherein the first controller applies a first adjustment signal to the first AC/DC/AC converter based on the first amount and the second controller applies a second adjustment signal to the second AC/DC converter based on the second amount, to cause the AC/DC/AC converters to collectively generate a second AC signal having a desired power factor different from the first AC signal, wherein, periodically, the first controller applies the first adjustment signal to the first AC/DC/AC converter and the second controller applies the second adjustment signal to the second AC/DC/AC converter, to gradually produce the second AC signal having the desired power factor.

16. The power adjusting circuit of claim 15, wherein the first AC output has current in phase with grid voltage and the second AC output has current that is in or out of phase with the grid voltage.

17. The power adjusting circuit of claim 15, wherein the first AC output consists entirely of active power and the second AC output contains at least one of reactive and harmonic power.

18. The power adjusting circuit of claim 15, wherein each controller is configured to wirelessly receive an amount of active power and an amount of reactive power to generate.

19. The power adjusting circuit of claim 15, wherein each AC/DC/AC converter comprises an AC/DC converter, a DC link capacitor, and a DC/AC converter connected in parallel with one another, wherein the AC/DC converter receives an AC output of the inverter.

20. The power adjusting circuit of claim 15, wherein the inverter comprises a DC/DC converter receiving an output of a photovoltaic array and a DC/AC converter receiving an output of the DC/DC converter.

21. The power adjusting circuit of claim 15, wherein the sensor is a Hall effect sensor including a portion encircling a wire connected to an output of the inverter.

22. The power adjusting circuit of claim 10, wherein the controllers negotiate with one another to determine fifth and sixth amounts of harmonic power to provide, wherein the first controller applies the first adjustment signal to the first AC/DC/AC converter based further on the fifth amount of harmonic power, and wherein the second controller applies the second adjustment signal to the second AC/DC/AC converter based further on the sixth amount of harmonic power.

* * * * *